(12) United States Patent
Porwal

(10) Patent No.: US 8,175,660 B2
(45) Date of Patent: May 8, 2012

(54) WIRELESS ENERGY TRANSFER

(75) Inventor: Gunjan Porwal, Banjara Hills (IN)

(73) Assignee: Qualcomm Incorporated, San Diego, CA (US)

(*) Notice: Subject to any disclaimer, the term of this patent is extended or adjusted under 35 U.S.C. 154(b) by 1075 days.

(21) Appl. No.: 11/928,796

(22) Filed: Oct. 30, 2007

(65) Prior Publication Data

US 2009/0108679 A1   Apr. 30, 2009

(51) Int. Cl.
*H04B 1/38* (2006.01)
*H04B 5/00* (2006.01)

(52) U.S. Cl. .............. 455/573; 455/41.1; 455/343.1

(58) Field of Classification Search ............ 455/41.1, 455/41.2, 573, 343.1, 574; 320/107, 128; 307/149

See application file for complete search history.

(56) References Cited

U.S. PATENT DOCUMENTS

| | | | | |
|---|---|---|---|---|
| 6,114,834 A * | 9/2000 | Parise | ............ | 320/109 |
| 6,127,799 A * | 10/2000 | Krishnan | ............ | 320/104 |
| 6,184,651 B1 * | 2/2001 | Fernandez et al. | ............ | 320/108 |
| 7,383,084 B2 * | 6/2008 | Stern et al. | ............ | 604/20 |
| 7,443,057 B2 * | 10/2008 | Nunally | ............ | 307/149 |
| 7,671,736 B2 * | 3/2010 | Iverson et al. | ............ | 340/539.22 |
| 7,868,586 B2 * | 1/2011 | Petterson et al. | ............ | 320/108 |
| 2008/0014897 A1 * | 1/2008 | Cook et al. | ............ | 455/343.1 |
| 2009/0039828 A1 * | 2/2009 | Jakubowski | ............ | 320/106 |
| 2010/0225270 A1 | 9/2010 | Jacobs et al. | | |

* cited by examiner

*Primary Examiner* — Sonny Trinh
(74) *Attorney, Agent, or Firm* — Knobbe Martens Olson & Bear LLP

(57) ABSTRACT

Method for wireless energy transfer is disclosed. According to an embodiment, the method includes transferring electrical energy from one electronic device to another electronic device with the help of electromagnetic waves. An electronic device that requires electrical energy can get energy transferred from one or more other electronic devices present in its vicinity. The electrical energy being transferred can be used to charge the battery of the electronic device.

24 Claims, 3 Drawing Sheets

WIRELESS ENERGY TRANSFER

BACKGROUND

A large number of electronic devices, for example mobile phones, laptops, PDAs, cameras, portable players, and similar devices, have rechargeable battery as their primary source of power. In such electronic devices, the battery gets discharged over a period of time and needs to be recharged. Existing systems recharge the battery by plugging the electronic device to an external power source. For example, a device may be recharged by deriving power from AC mains supply, through a DC adaptor, or through an USB port of a computer, etc. However, users of the electronic device may not always be present in the immediate proximity of AC mains, or cannot access AC mains at any instant of time. In such a case, recharging the electronic device would not be possible.

SUMMARY

This summary is provided to introduce systems and methods for transferring electrical energy from one electronic device to another electronic device, which is further described below in the Detailed Description. This summary is not intended to identify essential features of the claimed subject matter, nor is it intended for use in determining the scope of the claimed subject matter.

In one embodiment, the method includes selecting a first electronic device amongst one or more other electronic devices by a requesting electronic device. All the electronic devices are capable of storing electrical energy required for their normal functioning. The requesting electronic device when in need of electrical energy can request the first electronic device to transfer electrical energy to the requesting electronic device. Part of electrical energy stored in the first electronic device can be converted into electromagnetic signals which can be transmitted to the requesting electronic device. The requesting electronic device can receive the electromagnetic signals and convert it into electrical energy. The converted electrical energy can be used by the requesting electronic device for charging its battery.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Methods and systems for transferring electrical energy wirelessly from one electronic device to another electronic device are described. Generally portable electronic devices are capable of storing electrical energy in storage devices like storage batteries, and the like. The electrical energy stored in such storage devices get expended over a period of time. In such cases, an electronic device running short of electrical energy can request other electronic devices to transfer electrical energy. To this end, the electronic device upon receiving a request for electrical energy can generate electromagnetic signals by partly using its own stored electrical energy. The generated electromagnetic signals can be transmitted to the requesting electronic device. The requesting electronic device after receiving the electromagnetic signals, can convert the electromagnetic signals to a corresponding electrical charge that can be stored in an appropriate storage device.

The following disclosure describes systems and methods for wireless transfer of electrical energy. While aspects of described systems and methods for transferring electrical energy can be implemented in any number of different computing systems, environments, and/or configurations, embodiments for wireless energy transfer are described in the context of the following exemplary system(s) and method(s).

Figure 1:
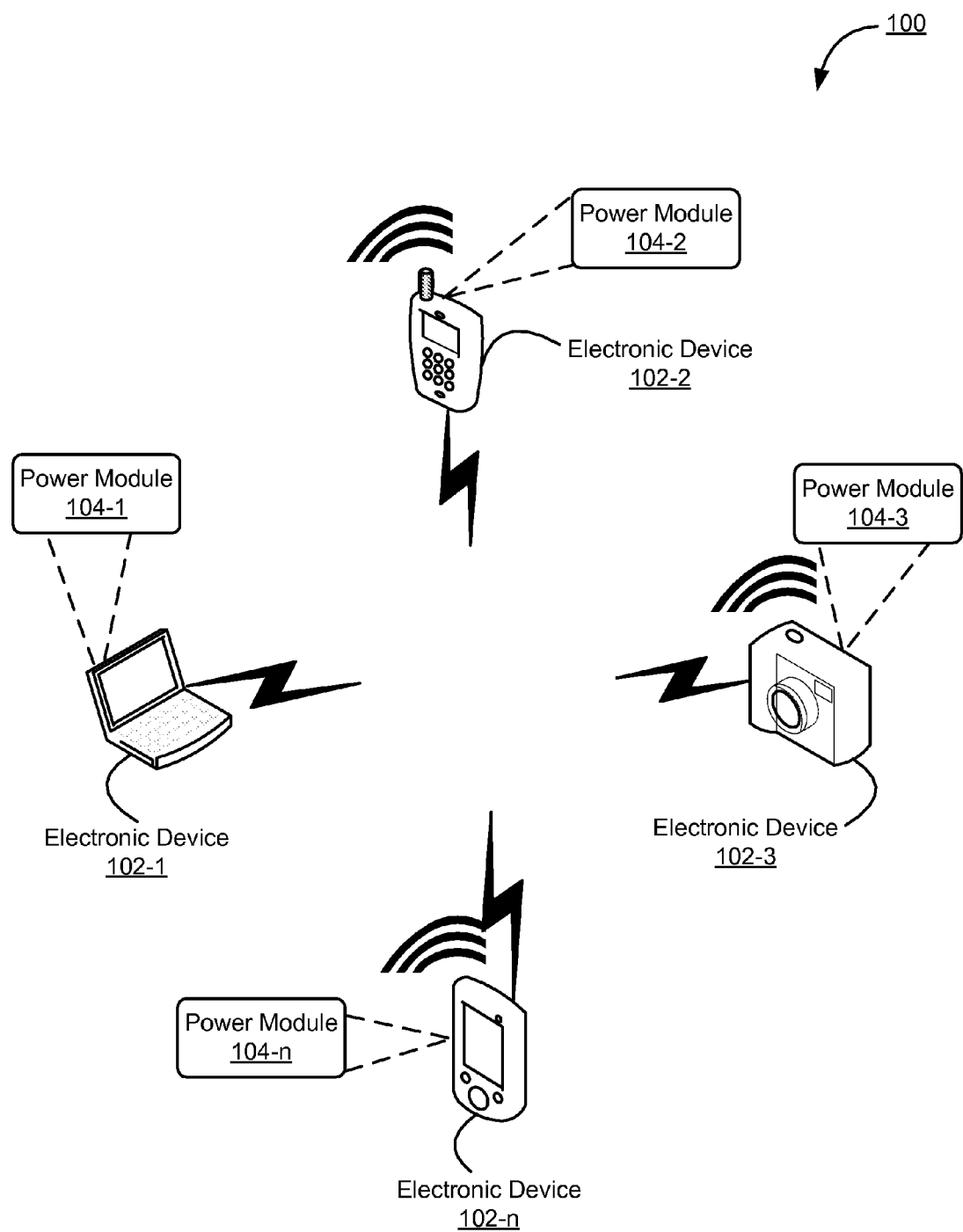
FIG. 1 illustrates an exemplary system for wireless energy transfer among electronic devices in an implementation.

FIG. 1 illustrates an exemplary system 100 for transferring electrical energy wirelessly. The system 100 includes plurality of electronic devices 102-1, 2, . . . , n. For the purposes of this description, electronic devices 102-1, 2, . . . , n can be interchangeably referred to as electronic devices 102. The electronic device 102 can be a mobile phone, laptop, PDA, camera, portable audio/video player, and the like. Such electronic devices 102 can communicate with each other directly, for example through IR or Bluetooth™.

Each of the electronic devices 102 additionally includes a power module 104. The power module 104 is instrumented to allow the transfer of electrical energy wirelessly. In an implementation, the power module 104 can convert electrical energy into electromagnetic signals and vice-versa. The electrical energy stored in an electronic device is usually DC power, which can be converted into AC power with the help of a DC-AC converter. The AC power is converted into electromagnetic signals using an antenna. The power module 104 includes transceiver(s) that sends and receives electromagnetic signals from one electronic device to another. The received electromagnetic signals are converted into electrical energy with the help of an AC-DC converter and a rectenna. The power module 104 can also determine the electric charge or the extent to which the power source, like a battery, can support the functioning of the electronic devices 102. Depending on the level of the electric charge stored, the power module 104 can decide whether the electronic device needs energy or not. For example, the power module 104 in electronic device 102-1 can determine the level of electric charge stored in its battery. If the level of electric charge is less than a threshold value (which may be defined by a user, pre-set or determined based on other factors), the electronic device 102-1 (interchangeably referred to as the requesting device 102-1) can communicate with one or more electronic devices 102 that may be present in the vicinity of the requesting device 102-1.

The request transmitted by the requesting device 102-1 may be received by one or more of the other electronic devices 102. The electronic devices 102 receiving the power request can either heed or reject the request. For example, electronic devices 102 in the immediate proximity of the requesting device 102-1 can accept the power request. Similarly far placed electronic devices 102 may reject the request, as it may not be possible to effectively transmit power over a larger distance.

Responsive to a request from the requesting device 102-1, any one of the electronic devices 102, say electronic device 102-2 can begin with the transmitting of electric charge as transmittable signals. For example, power module 104-2 can convert a portion of electric charge stored in the electronic device 102-2 into corresponding electromagnetic signals. In an embodiment, electrical energy stored in electronic device 102-2 is DC power that can be converted into electromagnetic signals that corresponds to AC power using a DC-AC converter. The AC power is converted into electromagnetic signals using an antenna. The signals can be transmitted to the requesting device 102-1 with the help transceiver(s) included in the power module 104-2. Transceiver(s) included in the power module 104-1, within the requesting device 102-1 receives the electromagnetic signals and converts it into electrical energy, which can be used to charge the requesting device 102-1. In an embodiment, at electronic device 102-1, received electromagnetic signals can be converted into DC power using a AC-DC converter and a rectenna.

In one implementation, requesting device 102-1 can detect one or more electronic device 102 having compatible parameters with the requesting device 102-1. Compatible parameters may include numerous factors like distance, the frequency at which the requesting device 102-1 communicates with other electronic devices 102, and so on. For example, the frequency may lie in the range of microwave radiations i.e., in the range of 0.3 GHz-30 GHz, ISM radio band, and the like.

In one implementation, electronic device 102-2 can transfer the electric charge while deriving power from an AC source. Hence the electronic device 102-2 can also transmit power while it itself is in a charging mode.

In another implementation, the requesting device 102-1 can request transfer of electrical energy simultaneously from two or more devices at the same time, or at different times. For example, the requesting device 102-1 can request transfer of electrical power from electronic device 102-2, electronic device 102-3, and so on, either at the same time, or one after the other.

Figure 2:
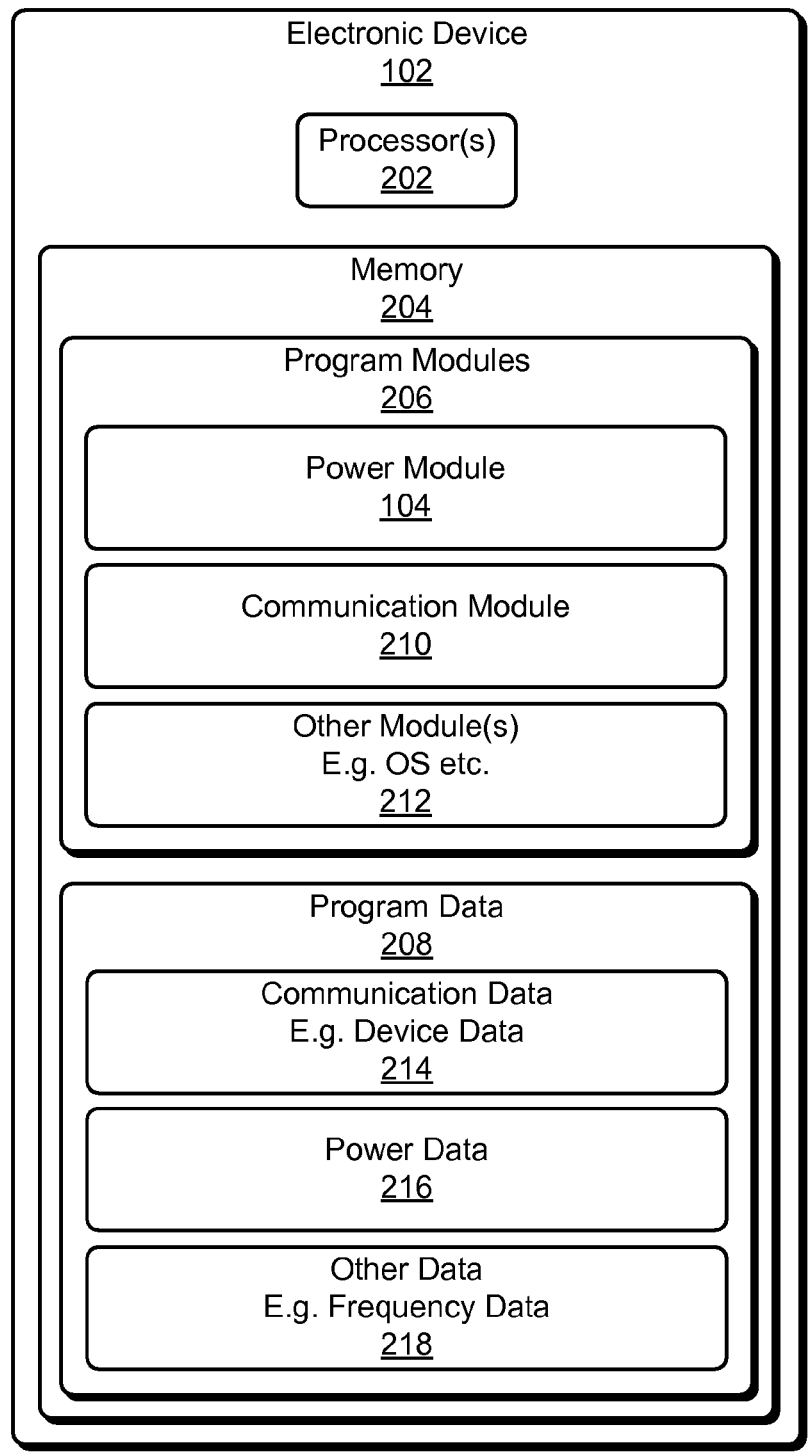
FIG. 2 illustrates an exemplary electronic device for wireless energy transfer according to an embodiment.

FIG. 2 shows exemplary components of electronic device 102. The electronic device 102 includes one or more processor(s) 202 coupled to a memory 204. Processor(s) 202 includes, for example, microprocessors, microcomputers, microcontrollers, digital signals processors, central processing units, state machines, logic circuitries, and/or any devices that manipulate data based on operational instructions. The processors can be configured to fetch and execute computer-program instructions stored in memory 204. Such memory 204 includes, for example, one or more volatile memory (e.g., RAM) and non-volatile memory (e.g., ROM, Flash etc.).

Memory 204 can also include program modules 206 and program data 208. Processor(s) 202 fetches and executes computer program instructions from the program modules 206. For example, program modules 206 can include instructions to perform wireless transfer of energy.

Program module(s) 206 includes the power module 104, a communication module 210, and other modules 212 for implementing wireless transfer of electrical energy between one or more electronic devices 102. Other module(s) 212 may include various other modules required for implementing additional functionalities in electronic device 102. Examples of other modules 212 include, but are not limited to an operating system, application software, etc. Program data 208 includes communication data 214, power data 216 and other data 218.

As specified previously, the power module 104 in each of electronic devices 102 can determine the amount of electrical charge left in their respective storage devices. For example, if the electrical charge present within the requesting device 102-1 is below a threshold value, then requesting device 102-1 can seek other electronic devices 102 in its proximity to derive electric charge from them. In one implementation, the communication module 210 can detect one or more electronic devices 102 present in the proximity of the requesting device 102-1. The proximity can be based on a pre-specified range within which the requesting device 102-1 can seek and detect other electronic devices 102. In an implementation, the proximity can be decided on the basis of the frequency at which electronic devices 102 communicate with each other. For example, if Bluetooth™ is used for communication between two or more electronic devices, the proximity is as per Bluetooth™ range and specifications. As illustrated, the communication module 210 can also be implemented in the electronic device 102-2. For example, any communication initiated by the requesting device 102-1 can be received by a corresponding communication module 210 in the electronic device 102-2.

In another implementation, the communication module 210 in the requesting device 102-1 generates a list of all the detected electronic devices. Depending on one or more factors (e.g., the compatibility parameters), any one of the electronic devices 102, say electronic device 102-2 can be selected from the generated list. The communication module 210 can also abstract information about the detected electronic devices 102. The information about the detected electronic devices 102 can pertain to type of device, device proximity, compatibility parameters, and so on. In such implementation, the information can be stored in communication data 214. After selecting a desired electronic device, say electronic device 102-2, the communication module 210 in the requesting device 102-1 can transmit a request message to electronic device 102-2, for transferring electrical energy. The electronic device 102-2 or the communication module 210 in the electronic device 102-2 can receive the request message. Upon receiving such a request, the electronic device 102-2 can reject or accept the request. For example, electronic device 102-2 may reject the request for transfer of electrical energy if its own electrical charge is just sufficient for its own operation (as determined, for example by power module 104-2). It should be appreciated that the acceptance or rejection can be based on any number of factors such as low battery, range limitation, compatibility issues, or a combination of them. If the electronic device 102-2 accepts the request, a message communicating the acceptance can be transmitted to the requesting device 102-1. Similarly, a message communicating a rejection can be communicated to the requesting device 102-1, allowing it to seek other devices that may be capable of transmitting power.

On receiving an acceptance from the electronic device 102-2, the power module 104-1 in the requesting device 102-1 can initiate the process of wireless energy transfer. The power module 104-2 in the electronic device 102-2 determines the amount of electrical energy stored and can also evaluate the amount of electrical charge that can be transmitted to the requesting device 102-1. The power module 104-2, depending upon the amount of electric charge remaining in electronic device 102-2, regulates the conversion of some part of its stored electrical energy into electromagnetic signals. For example, if 80 percent of electric charge is remaining, electronic device 102-2 may transfer 40 percent to the requesting device 102-1.

The converted electrical energy, now in the form of electromagnetic signals, can be transmitted from the electronic device 102-2 to the requesting device 102-1. For example, transceiver(s) included in the power module 104-2 in electronic device 102-2, can transmit the electromagnetic signals from electronic device 102-2 to the requesting device 102-1. In one implementation, the electromagnetic signals can be transmitted at a particular transmission frequency to requesting device 102-1.

The electromagnetic signals transmitted by the electronic device 102-2 can be received by the requesting device 102-1 with the help of transceiver(s) included in the power module 104-1. The power module 104-1 can receive the electromagnetic signals transmitted by the electronic device 102-2 at a particular reception frequency. The power module 104-1 converts the electromagnetic signals into a corresponding electrical charge that can be stored in the battery of the requesting device 102-1. The manner in which the electromagnetic signals can be converted to electrical energy can be accomplished by methods or techniques that are known in the art. For example, in requesting device 102-1, a signal converter can convert received electromagnetic signals into electrical energy. In the signal converter, the received electromagnetic signals correspond to AC power that can be converted into DC power using an AC-DC converter. In an implementation, both DC-AC and AC-DC conversion can be combined together in the signal converter included in power module 104. The electric charge once stored can be utilized by the requesting device 102-1 at its convenience or as per mandates defined by a user. In an implementation, the power module 104 can also perform various processing on the electrical charge stored or the electromagnetic signals that are to be transmitted. Examples of such processing include but are not limited to amplification, rectification, and so on.

It would be appreciated that the present description is in relation to a requesting device 102-1 and an electronic device 102-2. It would be understood that the same description can also be extended for a plurality of electronic devices 102. Wireless transfer of electrical power can hence be implemented amongst a plurality of devices, each of which can communicate with each other for the transfer of electrical energy.

Methods for wireless transfer of electrical energy between electronic devices can be described in the general context of computer executable instructions. Generally, computer executable instructions can include routines, programs, objects, components, data structures, procedures, modules, functions, and the like that perform particular functions or implement particular abstract data types.

Figure 3:
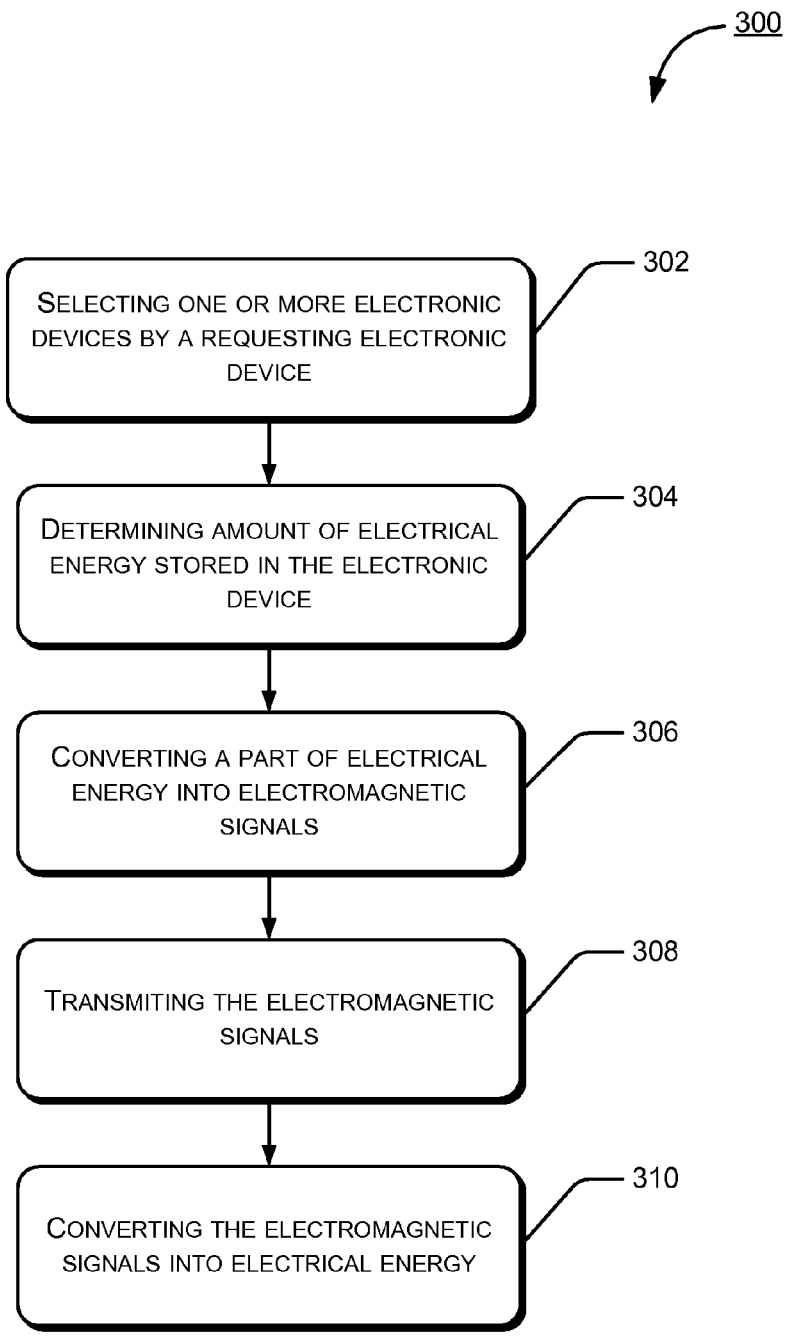
FIG. 3 illustrates an exemplary method of transferring energy wirelessly from one electronic device to another electronic device according to an embodiment.

FIG. 3, illustrating an exemplary method 300 for wireless energy transfer, is described with reference to the system 100. The order in which the method is described is not intended to be construed as a limitation, and any number of the described method blocks can be combined in any order to implement the method, or an alternate method.

At block 302, one or more electronic devices present in the vicinity of the requesting device can be selected. In an implementation, the communication module 210 in the requesting device 102-1 detects one or more electronic devices 102 present within its proximity. The proximity can be defined though a pre-specified range or it may depend on other factors like frequency at which requesting device 102-1 communicates with other electronic devices 102, and so on. In an implementation, the frequency may lie in the range of microwave radiations i.e. in the range of 0.3 GHz-30 GHz, ISM radio band, and the like. The requesting device 102-1 then selects at least one electronic device from the list of electronic devices 102 within the proximity of the requesting device 102-1. The selected electronic device, say electronic device 102-2, can then communicate an acceptance for transferring electrical energy responsive to the requesting device 102-1 requesting for charging.

At block 304, the amount of electrical energy stored in the electronic device can be determined. In one implementation, the amount of electric charge stored in the electronic device 102-2 can be determined by the power module 104-2. Depending on the level of the electric charge stored, the power module 104-2 can decide the amount of electrical energy to be transferred to the requesting device 102-1.

At block 306, a part of electrical energy stored in the electronic device can be converted into electromagnetic signals. In an implementation, the power module 104-2 can convert electrical energy stored in the electronic device 102-2 into corresponding electromagnetic signals with the help of a signal converter and an antenna. In another implementation, the power module 104-2 converts a part of the electric charge stored in electronic device 102-2, depending upon the amount of electrical energy stored.

At block 308, the electromagnetic signals can be transmitted from one of the electronic device to the requesting device. In one implementation, the converted electromagnetic signals from the electronic device 102-2 can be transmitted to the requesting device 102-1 by transceiver(s) included in the power module 104. The transmission of the electromagnetic signals can occur at a particular transmission frequency. For example, the transmission frequency can be selected from the range of microwave frequencies in the electromagnetic spectrum.

At block 310, the electromagnetic signals are received by the requesting device 102-1 with the help of transceiver(s) included in the power module 104-1. In an implementation, the electromagnetic signals can be received at a particular reception frequency. In another implementation, strength of the electromagnetic signals as received by the requesting device 102-1 can be enhanced by amplifying and rectifying the electromagnetic signals.

At block 310, the electromagnetic signals received from one of the electronic devices can be converted into electrical energy. In an implementation, the power module 104-1 converts the electromagnetic signals from electronic device 102-2 into corresponding electrical energy with the help of a signal converter and a rectenna. The electrical energy so obtained can be used to charge the battery of the requesting device 102-1. It may be appreciated that the requesting device 102-1 can further be a source of electrical energy for one or more other electronic devices 102.

Although embodiments of wireless energy transfer have been described in language specific to structural features and/or methods, it is to be understood that the appended claims are not necessarily limited to the specific features or methods described. Rather, the specific features and methods are disclosed as exemplary implementations of wireless energy transfer.

I claim:

1. A method of transferring electrical energy from a transmitting electronic device, the method comprising:
   receiving a request message for electrical energy from a requesting electronic device;
   responsive to the request message, converting a part of electrical energy stored in the transmitting electronic device into electromagnetic signals; and
   transmitting the electromagnetic signals to the requesting electronic device.

2. The method of claim 1, wherein the converting a part of electrical energy comprises determining the amount of electrical energy stored in the transmitting electronic device.

3. The method of claim 1, wherein the transmitting the electromagnetic signals comprises determining a transmission frequency.

4. A method of receiving electrical energy at a requesting electronic device, the method comprising:
   sending a request message for electrical energy to one or more electronic devices;

selecting a transmitting electronic device from the one or more electronic devices having compatible parameters with the requesting electronic device;

receiving electromagnetic signals based on a part of the electrical energy stored in the transmitting electronic device; and converting the electromagnetic signals into electrical energy at the requesting electronic device.

5. The method of claim 4, wherein the receiving electromagnetic signals comprises determining a reception frequency.

6. The method of claim 4, wherein the converting the electromagnetic signals comprises amplifying and rectifying the electromagnetic signals.

7. A system for transferring electrical energy from a transmitting electronic device, the system comprising:

a communication module configured to receive a request message for electrical energy from a requesting electronic device having compatible parameters with the transmitting electronic device; and a power module configured to:

convert a part of electrical energy stored in the transmitting electronic device into electromagnetic signals; and transmit the electromagnetic signals to the requesting electronic device.

8. The system of claim 7, wherein the power module determines a transmission frequency.

9. The system of claim 7, wherein the power module further determines an amount of electrical energy stored in the transmitting electronic device.

10. A system for receiving power at a requesting electronic device, the system comprising:

a plurality of electronic devices present within a pre-specified range of the requesting electronic device;

a communication module configured to send a request for electrical energy to one or more of the plurality of electronic devices having compatible parameters with the requesting electronic device; and a power module configured to:

receive electromagnetic signals based on a part of the electrical energy stored in the one or more of the plurality of electronic devices; and convert the electromagnetic signals into electrical energy at the requesting electronic device.

11. The system of claim 10, wherein the plurality of electronic devices is selected from a group consisting of cell phones, laptops, PDAs, cameras, and portable audio/video players.

12. The system of claim 10, wherein the power module determines a reception frequency.

13. The system of claim 10, wherein the power module amplifies and rectifies the received electromagnetic signals.

14. A transmitting electronic device transferring electrical energy, the transmitting electronic device comprising:

a processor;

a memory coupled to processor, said memory including one or more processor executable instructions;

a communication module configured to receive a request message for electrical energy from a requesting electronic device having compatible parameters with the transmitting electronic device; and a power module configured to:

convert a part of electrical energy stored in the transmitting electronic device into electromagnetic signals; and transmit the electromagnetic signals to the requesting electronic device.

15. The transmitting electronic device of claim 14 is selected from a group consisting of a cell phone, laptop, PDA, camera, and portable audio/video player.

16. The transmitting electronic device of claim 14, wherein the power module determines a transmission frequency.

17. The transmitting electronic device of claim 14, wherein the power module further determines an amount of electrical energy stored in the transmitting electronic device.

18. A requesting electronic device receiving electrical energy, the requesting electronic device comprising:

a processor;

a memory coupled to processor, said memory including one or more processor executable instructions;

a communication module configured to send a request to one or more electronic devices having compatible parameters with the requesting electronic device to transfer electrical energy; and a power module configured to:

receive electromagnetic signals based on a part of the electrical energy stored in a transmitting electronic device; and convert the electromagnetic signals into electrical energy at the requesting electronic device.

19. The requesting electronic device of claim 18 is selected from a group consisting of a cell phone, laptop, PDA, camera, and portable audio/video player.

20. The requesting electronic device of claim 18, wherein the power module determines a reception frequency.

21. The requesting electronic device of claim 18, wherein the power module further determines an amount of electrical energy stored in the requesting electronic device.

22. The requesting electronic device of claim 18, wherein the power module amplifies and rectifies the received electromagnetic signals.

23. A transmitting electronic device transferring electrical energy, the transmitting electronic device comprising:

means for converting a part of electrical energy stored in the transmitting electronic device into electromagnetic signals in response to receiving a request message for electrical energy from a requesting electronic device; and means for transmitting the electromagnetic signals to the requesting electronic device.

24. A requesting electronic device receiving electrical energy, the requesting electronic device comprising:

means for sending a request for electrical energy to one or more electronic devices;

means for selecting a transmitting electronic device from the one or more electronic devices having compatible parameters with the requesting electronic device;

means for receiving electromagnetic signals based on a part of the electrical energy stored in the transmitting electronic device; and means for converting the electromagnetic signals into electrical energy at the requesting electronic device.

* * * * *